United States Patent Office 3,286,854
Patented Nov. 22, 1966

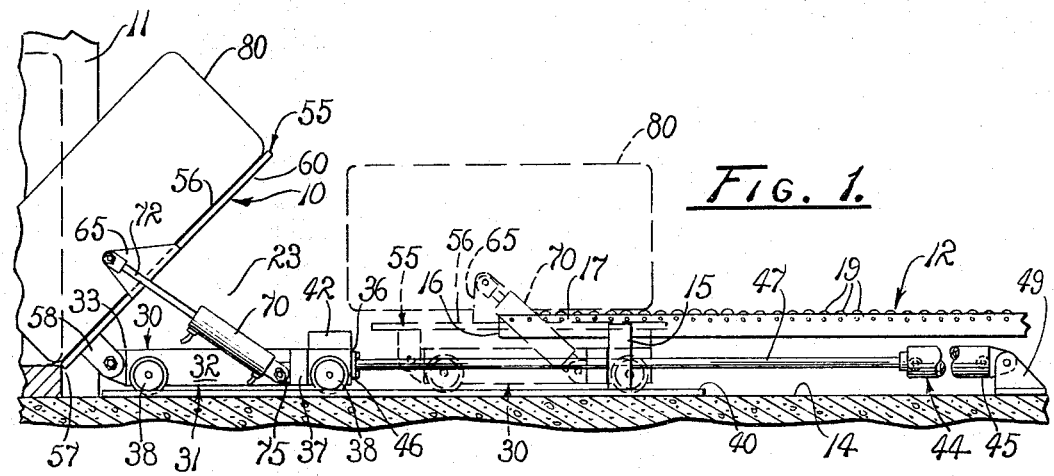
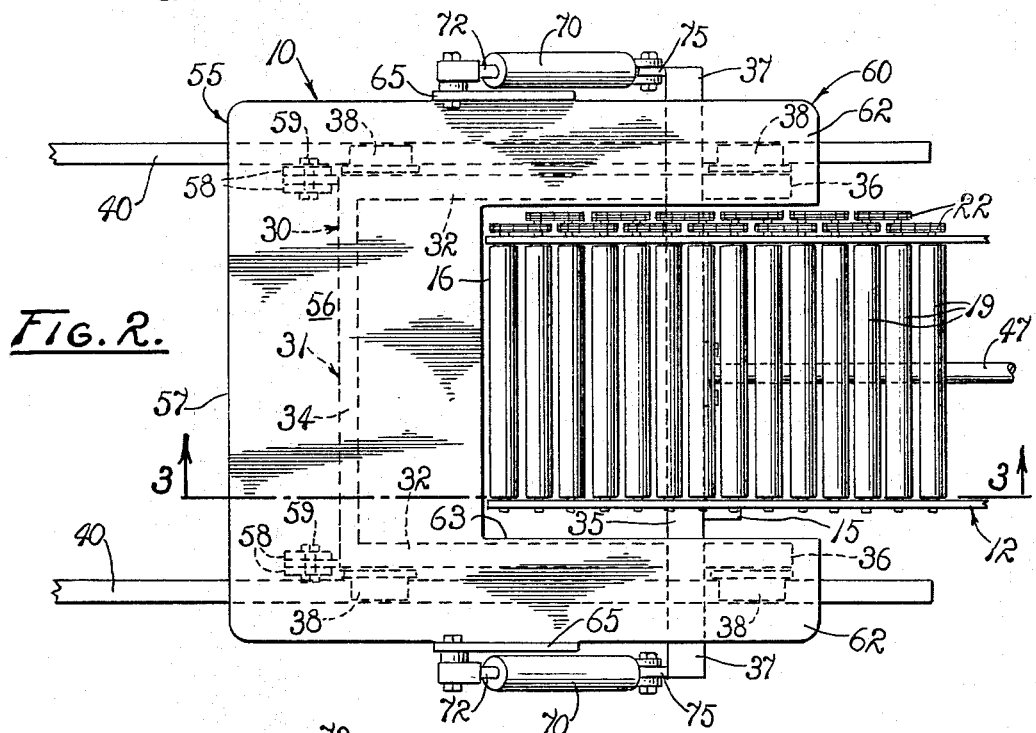
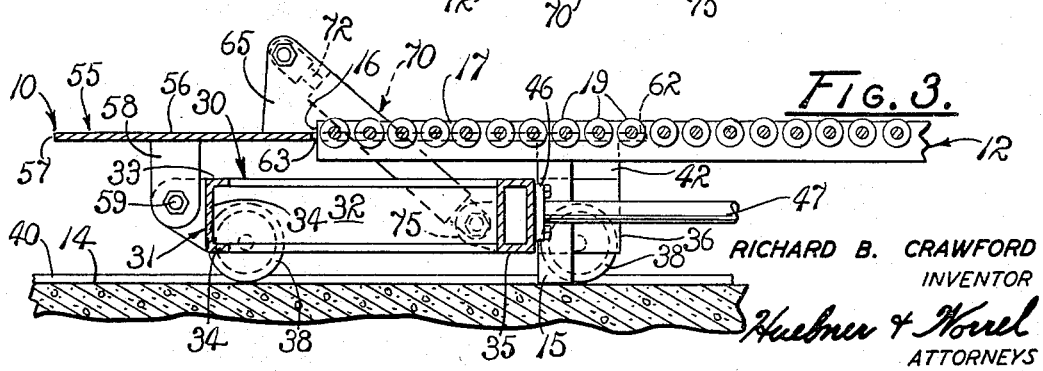

3,286,854
BALE HANDLING DEVICE
Richard B. Crawford, P.O. Box 664, Fresno, Calif.
Filed Dec. 2, 1964, Ser. No. 415,297
6 Claims. (Cl. 214—1)

The present invention relates to a bale handling device and more particularly to such a device for transporting bales between spaced loading and unloading stations, and which requires a minimum of manual positioning of the bales. While the structure of the present invention was specifically developed in connection with the handling of cotton bales, the invention is not limited thereto, but can be employed with equal utility for handling a wide variety of objects which are of a size not easily manipulated with conventional handling equipment.

It is a conventional cotton ginning practice to form the cleaned and ginned cotton into relatively lightly compressed low-density bales and to place a plurality of constraining bands around such bales in a low powered press, commonly known as a "dinky press." These low-density bales are known as "gin bales" which are usually stored at the gin prior to shipping. When a quantity of cotton is to be shipped, the size of the bales must be further reduced to provide a higher-density bale acceptable under shipping standards. In order to prepare the gin bales for shipment, they are re-compressed in the "dinky press" for removal of their restraining bands and the loose bales removed therefrom for transport to a press of greater capacity and spaced some distance from the "dinky press." The bales are then further compressed in the second press to a high density and smaller size and subsequently re-banded for shipping.

In the past, the transfer of the unbanded bales from the "dinky press" to the high-density press has presented an onerous task requiring the employment of several workmen. Such transfer of the bales is usually accomplished by manually operated hand trucks which are difficult to maneuver while loaded with the bulky and cumbersome gin bales. The gin bales are difficult to load from the "dinky press" onto the trucks and maintain such lightly compressed bales in unitary assembly. These problems have not been overcome by the recent use of powered lift trucks in that much of the loading and unloading operations must still be done by hand. Normally, such problem could be solved by providing an elongated conveyor between the "dinky press" and the high-density press. However, the banding operations necessary while the bales are disposed within the press require that an unrestricted area be maintained around the press to enable the workmen to have sufficient space in which to accomplish such task.

Therefore, it is a broad object of the present invention to provide an improved bale handling device which requires a minimum of manual bale positioning and movement.

Another object is to provide a bale handling device of the character described which is capable of transferring bales between loading and unloading stations without lifting.

Another object is to provide a bale handling device which permits substantially unrestricted access to the bale in the loading and unloading stations.

Another object is to provide a bale handling device which does not interfere with the usual bale tying or banding operations.

Another object is to provide a bale handling device which maintains the loading and unloading areas substantially free of any obstructions.

Another object is to provide a bale handling device which is selectively reciprocably movable through the loading and unloading areas.

Other objects and advantages of the present invention will become more fully apparent on reference to the accompanying drawing and the following description in the specification.

In the drawing:

FIG. 1 is a view in side elevation of a bale handling device embodying the principles of the present invention disposed between a bale press and a bale conveyor with alternate bale handling positions shown respectively in full and dashed lines.

FIG. 2 is a somewhat enlarged top plan view of the bale handling device shown in the dashed line bale handling position of FIG. 1.

FIG. 3 is a somewhat enlarged longitudinal vertical section through the bale handling device taken on line 3—3 of FIG. 2.

Referring more particularly to the drawing, a bale handling device embodying the principles of the present invention is generally indicated by the reference numeral 10. As best shown in FIG. 1, the bale handling device is disposed for operation between a pressing apparatus fragmentarily shown at 11 which may be representative of either a "dinky press" or a "high-density press" and an elongated bale conveyor 12. The pressing apparatus and conveyor are disposed upon a floor supporting surface 14. The conveyor is mounted in spaced, substantially parallel elevated position above the floor by a plurality of substantially vertical legs, a pair of which are indicated by the reference numeral 15. The legs are disposed in spaced relation from an end 16 of the conveyor to provide an overhanging portion 17 thereof. The conveyor includes a plurality of rollers 19 which are individually rotatably mounted and continuously driven by a plurality of chain and sprocket assemblies 22. These assemblies interconnect pairs of adjacent rollers for rotation in the same direction from a power source, not shown.

As best shown in FIG. 1, the end 16 of the conveyor 12 is spaced at a predetermined distance from the pressing apparatus 11 in order to provide a substantially unrestricted work area 23 adjacent to the pressing apparatus to enable workmen to install and remove the usual bale constraining bands. The end of the conveyor opposite to the end 16 which, although not shown, is disposed in similarly spaced relation to a pressing apparatus 11. A bale handling device 10 is disposed within the work area therebetween in a manner identical to the installation shown in FIG. 1. Accordingly, the end 16 of the conveyor may serve either as a bale receiving end or a bale discharging end. Similarly, it will become apparent that the bale handling device 10 is effective either to discharge bales onto the conveyor or to receive bales from the conveyor. In the first instance the handling device receives bales from the press and in the second instance discharges the bales into the press.

The bale handling device 10 provides a mobile carriage 30 having a box frame 31. The frame includes a pair of oppositely spaced substantially parallel side channel members 32 which are rigidly interconnected at one end 33 of the frame by a transversely disposed channel member 34. An elongated box section member 35 is transversely extended between the side members closely adjacent to an opposite end 36 of the frame and provides opposite end portions 37 transversely outwardly extended from the side members 32. A plurality of wheels 38 are rotatably mounted on the side members of the frame with the opposite pairs of wheels arranged for individual rolling engagement with a pair of spaced substantially parallel rail members 40 mounted on the floor surface 14.

A pair of stop blocks 42 are individually mounted on the side members 32 outwardly adjacent to the box section member 35. An hydraulic jack 44 is associated with the carriage 30 for reciprocating movement of the carriage along the rails 40. The jack has a cylinder end 45 pivotally connected to an upstanding bracket 46 rigidly secured to the floor surface 14. The jack also includes a piston rod 47 which is rigidly connected at its extended end to the box section member 35 of the frame 31 intermediate the side members 32 in substantially aligned relation with the longitudinal center of the frame beneath the conveyor 12. A pair of transversely spaced pivot brackets 49 are individually outwardly extended from the side members 32 adjacent to the end 33 of the frame.

A bale support pallet 55 having a substantially flat upper bale support surface 56 is disposed on the carriage 30. The upper surface is preferably roughened or textured in any convenient manner so as to provide the gripping surface for better retention of bales thereon. The pallet 55 has an end 57 overlying the end 33 of the frame 31, and a pair of transversely spaced arms 58 depending therefrom. The arms are individually pivotally connected to the pivot brackets 49 on the frame by pivot bolt and nut assemblies 59. The pallet further includes a bifurcated opposite end 60 providing a pair of opposite leg portions 62 which define therebetween a slot or opening 63 of a dimension somewhat greater than the width of the conveyor 12. A pair of upstanding side arms 65 are rigidly mounted on the upper surface 56 intermediate the ends of the pallet.

A pair of hydraulic lift jacks 70 are individually disposed adjacent to the opposite sides of the pallet and provide piston rod ends 72 individually pivotally connected to the side arms 65 for raising and lowering the pallet 55. The jacks also include opposite cylinder ends 74 individually pivotally connected to brackets 75, which are secured to the extended ends 37 of the box section 35 of the frame 31. As shown in FIGS. 1 and 2, a cotton bale indicated by the dashed lines at 80 is received upon the upper surface 56 of the pallet between the side arms 65.

*Operation*

The operation of the described embodiment of the subject invention is believed to be clearly apparent and is briefly summarized at this point. As shown in FIG. 1, the piston rod 47 of the hydraulic jack 44 is extended in its full line position to dispose the carriage 30 of the bale handling device 10 closely adjacent to the pressing apparatus 11. In such position, the hydraulic jacks 70 are actuated to extend their rod ends 72. Such action swings the pallet 55 about the pivot bolts 58 to dispose the pallet at a substantially 45° angle with respect to its substantially horizontal dashed line position. The pallet is thereby in position to receive the bale 80 from the pressing apparatus 11. In order to effect such transfer, the bale is easily manually tipped from its upright position in the pressing apparatus to the position rested upon the upper surface 56 of the pallet. As described, the coefficient of friction between the upper surface and the bale is sufficient to hold the bale in such inclined position without slippage.

As soon as the bale is disposed upon the pallet, the hydraulic jack 44 is actuated to retract the piston rod 47. Such action pulls the carriage 30 along the rails 40 toward the conveyor 12. The hydraulic jacks 70 are concurrently actuated to retract their rod ends 72 so as to lower the pallet 55 and bale 80 toward the conveyor. When the jack 44 is fully retracted the carriage is disposed in the position shown in FIG. 3 beneath the overhanging portion 17 of the conveyor. During such downward movement of the pallet the opening 63 therein permits the conveyor to pass therethrough as the legs 62 are lowered past the upper peripheries of the rollers 19 until they come to rest upon the stop blocks 42. Such movement of the arms to a position below the upper peripheries of the rollers of the conveyor causes more than half of the bale to be deposited on the overhanging portion 17 of the conveyor. The rollers 19 are then effective to pull the remainder of the bale completely onto the conveyor and transport it to the right, as viewed in FIG. 1. With the carriage and pallet disposed in the described inter-fitting relation at the end 16 of the conveyor, the work area 23 adjacent to the pressing apparatus 11 is maintained substantially free of any obstruction. This permits substantially unrestricted movement of workmen in the work area to attend the bales in the pressing apparatus.

As described, the bale handling device 10 of the present invention may also be used at the end of the conveyor opposite from the end 16 in order to receive bales being discharged from the conveyor and to deposit the bales into a high-density press. Such operation may be conveniently described with reference to the structure shown in FIG. 1, wherein the conveyor rollers 19 are driven in the opposite direction from that previously described in order to transport the bales 80 in a direction from right to left. During such operation the rollers are stopped when the bale reaches the dashed line position, as shown in FIG. 1, so as to superimpose successive bales above the pallet 55. The hydraulic jack 44 is actuated to extend the piston rod 47 to move the carriage 30 along the rails 40 toward the pressing apparatus 11. At such time, the hydraulic jacks 70 are actuated to elevate the pallet 55 to its upwardly inclined position, which movement is synchronized to reach its maximum 45° inclined position with respect to the horizontal at the maximum extension of the hydraulic jack 44. The bale 80 is then easily manually tipped into the desired upright compressing position within the pressing apparatus. As described, the coefficient of friction between the upper surface 56 of the pallet and the bale is sufficient to preclude any relative sliding movement of the bale thereon when disposed in such inclined position.

In view of the foregoing, it is readily apparent that the structure of the present invention provides an improved bale handling device which enables workmen to transport bales between the pressing apparatus 11 and the conveyor 12 with a minimum of manual positioning. The bale handling device permits the area adjacent to the compressing apparatus to be maintained substantially free of any obstructions for unrestricted movement of workmen thereabout, and does not interfere with normal banding operations. The device is adapted to either end of the conveyor for either discharging bales onto the conveyor or receiving bales therefrom and effectively maintains unbanded bales in their desired unitary condition.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A bale handling device adapted to transport bales between a bale press and a conveyor spaced from the press comprising a carriage; first powered means connected to said carriage for selective reciprocal movement of the carriage along a predetermined path of travel between the press and the conveyor; a bale support pallet pivotally mounted on the carriage and having a pair of opposite leg portions defining therebetween a slot at least wider than said conveyor; and second powered means mounted on the carriage and connected to the pallet at a point eccentrically from said pivotal connection of the pallet with the carriage for selective swinging movement of the pallet between a substantially horizontal position when disposed adjacent to the conveyor, and a position upwardly inclined from the carriage adjacent to the press said leg portions being adapted to extend on opposite sides of the conveyor when the carriage is disposed in said horizontal position.

2. A bale handling device adapted to transport bales between a bale press and a conveyor spaced from the press comprising a carriage; track means extended between said press and the conveyor supporting the carriage; first powered means connected to said carriage for selective reciprocal movement of the carriage along said track means between said press and the conveyor; a bale support pallet pivotally mounted on the carriage and having a pair of opposite leg portions defining therebetween a slot wider than said conveyor; and second powered means mounted on the carriage and being connected to the pallet at a point eccentrically from said pivotal connection of the pallet with the carriage for selective swinging movement of the pallet between a substantially horizontal position when disposed adjacent to the conveyor, and a position upwardly inclined from the carriage and disposed adjacent to the press said leg portions extending on opposite sides of the conveyor when the carriage is disposed in said horizontal position.

3. A handling device adapted to transport cotton bales between a bale press and a conveyor spaced from the press comprising a carriage; track means extended between said press and the conveyor supporting the carriage; first powered means connected to said carriage for selective reciprocal movement of the carriage along said track means between said press and the conveyor; a pallet having a substantially flat upper bale support surface pivotally mounted on the carriage, said pallet including a pair of opposite leg portions defining therebetween a slot at least wider than said conveyor; second powered means mounted on the carriage and being connected to the pallet at a point eccentrically from said pivotal connection of the pallet with the carriage for selective swinging movement of the pallet between a substantially horizontal position when disposed adjacent to the conveyor, and a position upwardly inclined from the carriage adjacent to the press said leg portions extending on opposite sides of the conveyor when the carriage is disposed in said horizontal position, and bale retaining means on said upper surface of the pallet releasably to constrain the bale thereon when the pallet is disposed in said upwardly inclined position.

4. The handling device of claim 3 in which said bale retaining means comprises a textured material to provide a plurality of bale gripping members on the upper surface of the pallet.

5. A handling device adapted to transport bales of cotton between a bale press and a substantially horizontal elongated conveyor having a delivery end spaced from the press comprising a carriage; means supporting the carriage for reciprocal movement between the conveyor and the press; first controlled powered means connected to the carriage for selective reciprocal positioning of the carriage; a pallet having a substantially flat continuous upwardly disposed bale support surface, a receiving edge providing a marginal opening adapted to receive the delivery end of the conveyor when the carriage is at the conveyor, and an opposite edge; a pair of legs integral with the pallet, downwardly extended therefrom in substantially equally spaced relation to said opposite edge of the pallet, and pivotally connected to the carriage whereby pivotal movement of the pallet causes said opposite edge of the pallet to describe an arc endwardly and downwardly of the carriage to facilitate slidable discharge of bales from the pallet into the press; a pair of legs rigidly mounted on the carriage and upwardly extended therefrom on opposite sides of the marginal opening, said pivoted and rigid legs being adapted to support the pallet in a substantially horizontal position adjacent to but below the elevation of the conveyor; and second controlled power means mounted on the carriage and connected to the pallet at a point eccentrically of the pivotal connection of the legs to the carriage for swinging movement of the pallet between its substantially horizontal position and an upwardly inclined position to discharge a bale therefrom.

6. The handling device of claim 5 in which the marginal opening extends more than one-half of the distance across the pallet so as to accommodate receipt of the delivery end of the conveyor to a position past the center of the pallet.

References Cited by the Examiner

UNITED STATES PATENTS

| | | | |
|---|---|---|---|
| 2,508,698 | 5/1950 | Von Beren | 214—1 X |
| 2,901,136 | 8/1959 | Belk | 198—33 X |
| 2,954,863 | 10/1960 | Staples | 198—33 |

FOREIGN PATENTS 720,013   12/1954   Great Britain.

MARVIN A. CHAMPION, *Primary Examiner.*